United States Patent Office 3,814,651
Patented June 4, 1974

3,814,651
LABELER
Tokio Wada, Tokyo, Japan, assignor to Shinsei Industries Co., Ltd., Tokyo, Japan
Filed May 31, 1972, Ser. No. 258,247
Claims priority, application Japan, June 5, 1971, 46/47,206
Int. Cl. B65c 9/18
U.S. Cl. 156—541                                    16 Claims

ABSTRACT OF THE DISCLOSURE

A labeler wherein a label carrying tape on which a plurality of labels are adhered in succession with small intervals is folded by a label returning part to turn back at a label hammer-out opening so that a label is detached from the tape to project into a space formed in said opening. The detached label is retained by the label holders which are moved in the feeding direction along with movement of the tape and the label is hammered out for affixing when it comes to a specified position.

BACKGROUND OF THE INVENTION

The present invention relates to a labeler which is devised to affix labels onto objects by detaching labels adhered onto a tape in succession and hammering out the labels.

Conventional labelers have been constructed so that a tape on which labels are adhered is fed by a certain fixed length with an operating means such as, for example, a lever, a label for affixing is detached at an opening and the detached label is affixed onto an object such as, for example, a carton container, parcel or the like while the labeler is slid by rubbing the surface of the object to which the label is to be affixed. Therefore, the conventional labelers are disadvantageous in the following points.

The labelers require operation of an operating means for feeding a label to the opening for affixing and affixing effort to paste a label onto an object by rubbing; accordingly, the operation efficiency is low and a labeler requires a space large enough to slide the labeler for affixing the label. Therefore, it has been difficult for conventional labelers to affix a label onto a small object or an object placed a small space where the labeler cannot be slid.

For these reasons, the labelers which hammer out labels when affixing the labels have been developed. This type of the labeler is disadvantageous because a label is held by the opening frame for hammering out and then hammered out. Therefore a size of the label is limited by the size of the opening frame.

The present invention provides a labeler from which the above-mentioned disadvantages are eliminated.

SUMMARY

A labeler according to the present invention comprising a tape being wound in the form of a roll on which a plurality of labels are adhered in succession with predetermined small intervals therebetween. The detachable surfaces of labels are stuck onto the tape. A case having a tape retaining means retains a tape roll rotatably and a tape feed passage is formed with guide rollers and guide plates so that the tape runs in the tape feed passage. A tape returning part which folds the tape to return back at a position of said tape feed passage so that said returning part contacts the rear surface without labels of the tape sheet of the label carrying tape and detaches a label from the sheet of tape as the tape is fed. A label hammer-out opening which is provided in the case by positioning the tape returning part at one edge of the opening so that the detached label is projected into the label hammer out opening. A tape feeding means pulls the free end of the tape folded at the tape returning part to feed the tape a certain required distance. A moving part moves in the label hammer-out opening along with movement of the tape, while at least one label holder holds at least one point of the label being projected into said opening. A hammer part is driven out from the case through said opening without contacting the label holder to hammer out the label from the label holder after completion of movement of said moving part and a resetting means resets said hammer part after hammering out the label and the moving part after resetting the hammer part and thus makes it possible to resume operation of the tape feeding means after resetting the moving part. At least one label holder is positioned at a position near the tape returning part so that the adhesive surface of a projected end of the label in said opening sticks to the label holder at the initial stage of feeding of the tape and the label holder is separated from said tape returning part in the tape feed direction during movement of the tape. The tape feeding means is devised so that the tape is fed by the length to the extent that the rear end of the label is not detached from the tape when the label is extended in said label hammer out opening and the hammer part hammers out the label which is projected into said opening and is held by the label holder at its projected end and by the tape at its rear end.

BRIEF DESCRIPTION OF THE DRAWINGS

The present invention is illustrated in detail by the accompanying drawings whereon.

DETAILED DESCRIPTION

Referring to FIGS. 1 to 5, there is shown a labeler according to the present invention comprised of label carrying tape 10 which is wound in the form of roll, case 20 is provided with a retaining means such as, for example, retaining frame 21 which supports rotatably said tape 10, guide 30 secures movement of label carrying tape 10, and tape returning part 40 is provided following to said guide 30. Label hammer-out opening 50 is formed by said tape returning part which is positioned at or near an edge of the opening, moving part 60 is moved in said label hammer-out opening, and guide frame 70 guides the free end of tape 10 folded at said tape returning part to the outside of the case. Tape feeding means 80 holds and moves the tape in said guide frame, hammering part 90 is driven out from said label hammer-out opening 50 when moving part 60 is moved, hammering means 100 drives out said hammering part 90 and actuating means 200 actuates said tape feeding means 80 and hammering means 100.

Figure 12:
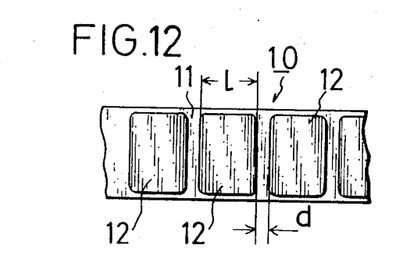
FIG. 12 is a plan view illustrating part of a tape to be employed in the labeler.

Label carrying tape 10 (hereafter referred to as "tape") consists of tape sheet 11 the surface of which is smoothed to reduce the adhesive effect and a plurality of labels 12 to the rear surfaces of which an adhesive agent is applied to adhere the labels onto said tape sheet 11 with predetermined small intervals $d$ as shown in FIG. 12, and accordingly, labels 12 can be easily removed from tap sheet 11 and are affixed on the articles owing to the adhesive agent applied to their rear surfaces.

Guide, 30 is provided to guide the free end of said tape 10 to tape returning part 40. This guide need not be provided depending on the case.

A plural number of guide rollers 31 are provided at the tape passage to smooth feeding of the tape.

Tape returning part 40 is designed to fold the tape so that the rear surface of the tape sheet contacts said part 40 and is provided at a position near the lower edge of label hammer-out opening 50 formed at case 20. Accordingly when the tape is folded to turn back at the tape returning part, label 12 is projected into the space formed in label hammer-out opening so that its adhesive surface is faced outside.

Arrow marks M are provided on the outer surface of case 20 to indicate label hammer-out opening 50. It is desirable to provide arrow marks M at both right and left sides of tape returning part 40 and the upper center of label hammer-out opening 50.

The free end of tape sheet 11 folded to return by tape returning part 40 is drawn outside the case through guide frame 70. Guide frame 70 is comprised of guide plate 71 which receives tape sheet 11 and resilient member 72 such as, for example, a bar spring which is arranged to oppose in parallel guide plate 71. One end of said resilient member 72 at the side where the tape sheet is inserted is fixed by supporting shaft 73 and the other end at the side where the tape sheet is fed out is made as the free end.

Free end 721 of said resilient member 72 is provided with spring 74 by which the free end of the resilient member is forced to separate from the free end of guide plate 71. Tape feeding means 80 is provided near said guide frame 70.

Tape feeding means 80 in this embodiment is comprised of tape receiving plate 81 the upper end of which is rotatably retained so that its moving end along tape passage $t$ formed between guide plate 71 and resilient member 72 of guide frame 70 and is provided with tape receiving surface 811, rotary sub-plate 82 one end of which is fixed rotatably at the body part of said tape receiving plate 811, so that the free end is ready to depress said tape receiving surface 811 when said rotary sub-plate is rotated and reset spring 83 which usually keeps rotary sub-plate 82 away from tape receiving surface 811.

This tape feeding means 80 is actuated by actuating means 200.

Actuating means 200 in this embodiment is comprised of an operating member such as, for example, lever 210 which is rotatably retained at case 20, reset spring 220 for this lever, rotary lever 230 which is rotatably retained at lever 210, rotary coupling plate 240 which is rotatably retained at rotary lever 230, connecting member 250 which is rotatably retained at said rotary coupling plate 240 and spring 260 which is retained at coupling plate 240.

Said lever 210 is provided so that it is gripped together with handle 22 formed at the case and said lever is provided with oval hole 211 in the direction of its rotation. The lever is rotatably secured by pivot 212 fixed at the case.

Lever 210 is provided with cam part 213 which can be rotated at the pivot in said oval hole 211 and this cam part 213 is opposed to the free end of resilient member 72 of guide frame 70.

Resetting spring 220 is attached to the upper end of said lever 210, and the lower end of lever 210 is usually maintained by said spring at the home position away from handle part 22 of the case.

Figure 1:
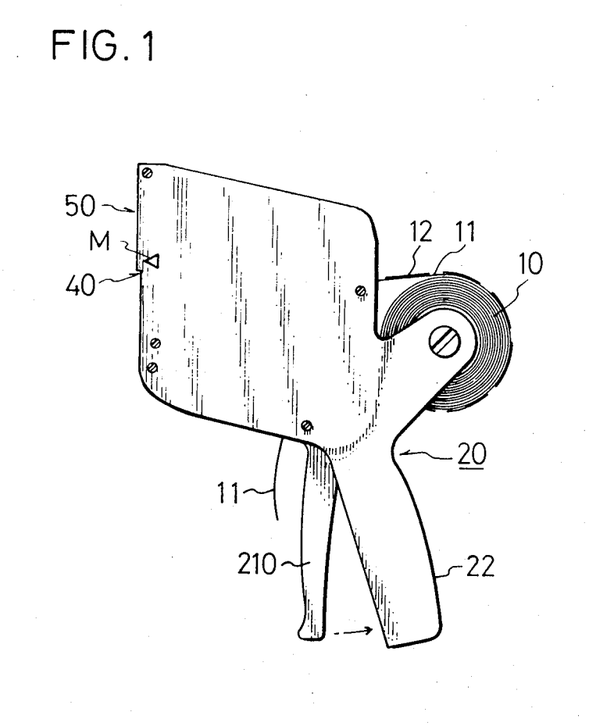
FIG. 1 is a side view of a labeler according to the present invention.
Figure 2:
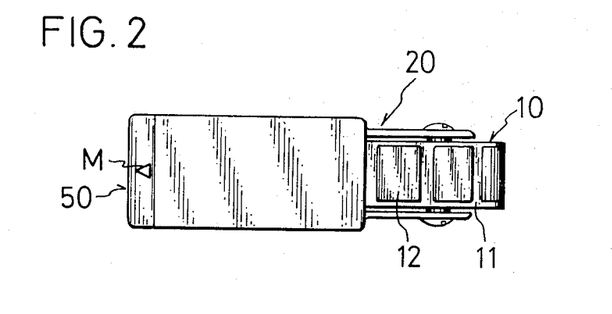
FIG. 2 is a plan view of the labeler.
Figure 3:
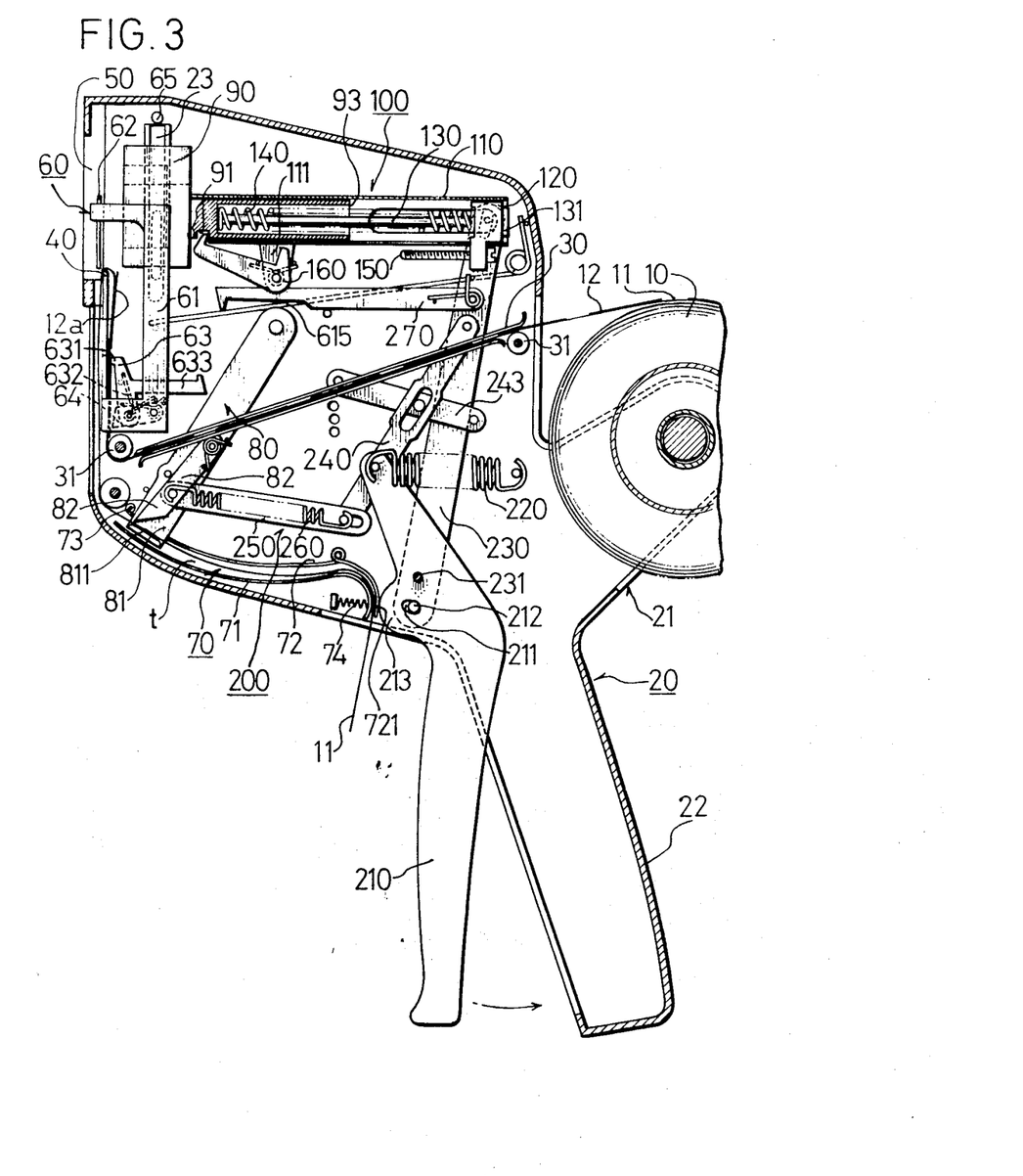
FIG. 3 is a cross sectional side view of the interior of the labeler in a normal condition.

Under this condition, as shown in FIG. 3, pivot 212 is forced to contact one end of oval hole 211. When lever 210 is pulled in the arrow indicated direction, pivot 212 comes in contact with the other end of oval hole 211.

Accordingly, when lever 210 is released, cam part 213 causes free end 721 of resilient member 72 of guide frame 70 to pressure-contact guide plate 71 and when lever 210 is pulled toward the handle, cam 213 is separated from resilient member 72; therefore, the tape outlet of guide frame 70 is opened only when lever 210 is pulled toward the handle.

Said oval hole 211 is convenient for use of tapes in different thickness. The lower end of rotary lever 230 is overlapped with lever 210, is rotatably retained by pivot 212 and is moreover rotatably secured at lever 210 by pivot 231 provided above pivot 212 on the lever.

Rotary lever 230 is rotated at pivot 231 and said rotary lever is rotated by the action of pivot 212 when lever 210 is gripped together with the handle.

The upper end of rotary coupling plate 240 is rotatably secured at rotary lever 230 and the lower end is rotatable at the free end. Furthermore, long hole 241 is provided in the lengthwise direction of the main part of coupling plate 240. Retaining shaft 242 is provided in said long hole 241. Accordingly, the free end of rotary coupling plate 240 rotates around retaining shaft 242 as the fulcrum. Retaining shaft 242 is provided with the position adjusting means by which the rotation angle of rotary coupling plate 240 is adjusted and the tape feed distance by tape feeding means 80 is adjusted.

The position adjusting means can be designed as desired; for example, it can be devised so that the position of retaining shaft 242, which is to be provided at rotary plate 243 which is secured at one end, is adjusted by rotating the free end of rotary plate 243. In this case, it is desirable for fixing the free end of rotary plate 243 at the displacing point to provide pin 243a at the free end of rotary plate and to insert this pin selectively into one of a plural number of holes 243b.

The free end of rotary coupling plate 240 is provided with pin 244 and actuating spring 260 is provided between pin 244 and rotary sub-plate 82 of tape feeding means 80. When rotary coupling plate 240 rotates, actuating spring 260 pulls rotary sub-plate 82 to make its free end pressure-contact tape receiving surface 811 of tape receiving plate 81.

One end of connecting plate 250 is rotatably retained at tape receiving plate 81 and the other end is provided with oval hole 251 in the lengthwise direction into which pin 244 of rotary coupling plate 240 is fitted. Pin 244 is pulled by spring 260 to pressure-contact the end of oval hole 251 as shown in FIG. 3.

Actuating means 200 is provided with releasing means 270 which releases moving part 60, and label hammering means 100 in addition to the above-mentioned parts 20, 210, 220, 230 and 240.

Hammering means 100 is comprised of guide cylinder 110 which is fixed at the case and provided with guideways at its side and bottom. Slide 120 is housed in guide cylinder 110 so as to slide therein and is coupled to the upper end of rotary lever 230 with pin 121 inserted through the side guideway of the guide cylinder. The end of slide shaft 130 is inserted with play into said slide 120 in the guide cylinder and hammering spring 140 is mounted on slide shaft 130. Extension piece 150 is fixed at projection 122 which is provided at said slide 120 and is protruded downward from the bottom guideway of the guide cylinder. Hook member 160 is provided at the underside of the guide cylinder.

Slide shaft 130 is arranged in the lengthwise direction of guide cylinder 110 so that it slides in the guide cylinder and is provided with stopper 131 which comes in contact with the rear surface of slide 120. Hammering part 90 is fixed to the free end of slide shaft 130.

Pin 121 is inserted into oval slot 122 provided in slide 120, which can be straightly reciprocated in accordance with movement of rotary plate 230 owing to the oval slot provided.

Hammering spring 140 is positioned between slide 120 and hammering part 90 and is usually stretched to the maximum limit.

Hook member 160 is rotatably secured at bracket 111 extending downward from guide cylinder 110 and its rotary end is formed in a shape of pawl and is held by reset spring 162 so that pawl end 161 usually hooks hammer part 90. Hammer part 90 is provided with a notch into which pawl end 161 of the hook member is fitted.

End 163 opposed to pawl end 161 of said hook member 160 is opposed to extension piece 150 and when it is pressed by extension piece 150 the hook member is rotated to disengage pawl end 161 from notch 91 of the hammer member.

Hammer part 90 is comprised of hammer member 92 of elastic material and slide member 93. The hammer member 92 is inwardly positioned at label hammer-out opening 50 and the surface appearing hammer-out opening 50 is formed as hammering surface 921. Hole 921a is provided at the center of hammering surface 921. Slide member 93 is fixed to the rear surface of said hammer part, and slide member 93 is slidably inserted in guide cylinder 110. This slide member 93 is provided with said notch 91. The hammer-out opening 50 is provided with moving part 60.

Moving part 60 is supported by a pair of guideways 23 vertically provided at both side walls of case 20. It is provided with main frame 61 which slides vertically along said guideways, label holder 62 is attached to said main frame 61 and label sensing pawl 63 and tape holder 64 are provided at the lower portion of main frame 61.

Main frame 61 is comprised of side plates 612 respectively provided with guide portion 611 which fits into each guideway 23, bracket 613 arranged between the upper ends of said side plates, tape support plate 614 arranged between the lower ends of the side plates and spring 615 which pushes the main frame down. Label holder 62 which can hold an end of the label is provided at a certain surface of the main frame such as, for example, bracket 613.

This label holder 62 is arranged so that its one end is projected into the space of frame 61 and is of a bar type provided with a thread so that the length of the projected portion can be adjusted.

Label sensing pawl 63 is rotatably retained with its base part at tape holder 64 and has the free end formed as hook end 631 which it can engage with the front edge of label 12 of the tape. Hook end 631 is opposed to tape support plate 614.

Label sensing pawl 63 is provided with spring 632 by which hook end 631 is depressed onto tape support plate 614. Moreover, the label sensing pawl is provided with latch arm 633 which is extended from the rear side of main frame 61 of the moving member through the space formed between the side plates of main frame 61 and the extreme end of the latch arm is formed as hook end 633a facing upward.

Tape holder 64 rotatably secures the base of label sensing pawl 63 at its main part and, at the same time, is rotatably secured at the main frame with its base part.

When label sensing pawl 63 is engaged with label 12 and pulled upward against spring 632', the free end of tape holder 64 turns upward. The free end of tape holder 64 is slanted to make the lower end press the tape; accordingly, protruding end 641 comes in contact with tape 10 because tape holder 64 is pulled upward and depresses the tape along with running of the tape.

Figure 7:
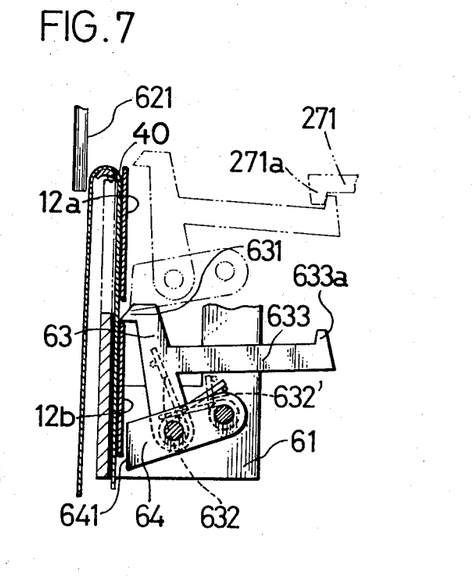
FIG. 7 is a side view of the label sensing pawl illustrating the operation of the sensing pawl of the moving part.
Figure 8:
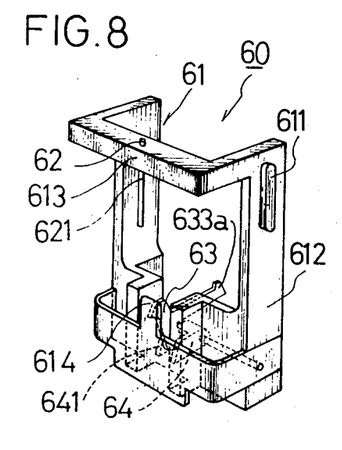
FIG. 8 is an isometric view of said moving part.

Spring 632' is adapted to depress tape holder 64 downward at all times as shown in FIG. 7, and by this spring 632', protruding end 641 of tape holder 64 is released from tape 10 when hook end 631 is released from label 12.

The upward stroke of main frame 61 is limited by stopper 65 provided above guideways 23. Therefore, the upward limit position of moving part 60 is fixed at all times. For rotating the label sensing pawl against spring 632, releasing means 270 for latch arm 633 of label sensing pawl 63 is provided at actuating means 200.

Releasing means 270 is comprised of long latch arm 271 whose base part is rotatably secured at rotary lever 230 and free end 271a formed as a hook facing downward. Spring 272 pushes down long latch arm 271 and stud 273 receives the lower side of long latch arm 271 to keep it horizontal.

Long latch arm 271 engages latch arm 633 when moving part 60 is lifted and pulls latch arm 633 to separate label sensing pawl 63 and tape holder 64 from label 12 when hammering part 90 moves back. Accordingly, long latch arm 271 is retained at rotary lever 230 in the arrangement satisfying the relative positions described above.

In other words, long latch arm 271 comes above latch arm 633 earlier than lifting of latch arm 633 of moving part 60 when the lever is gripped into the handle of the case.

The following describes the operation of the labeler according to the above embodiment of the present invention.

Figure 4:
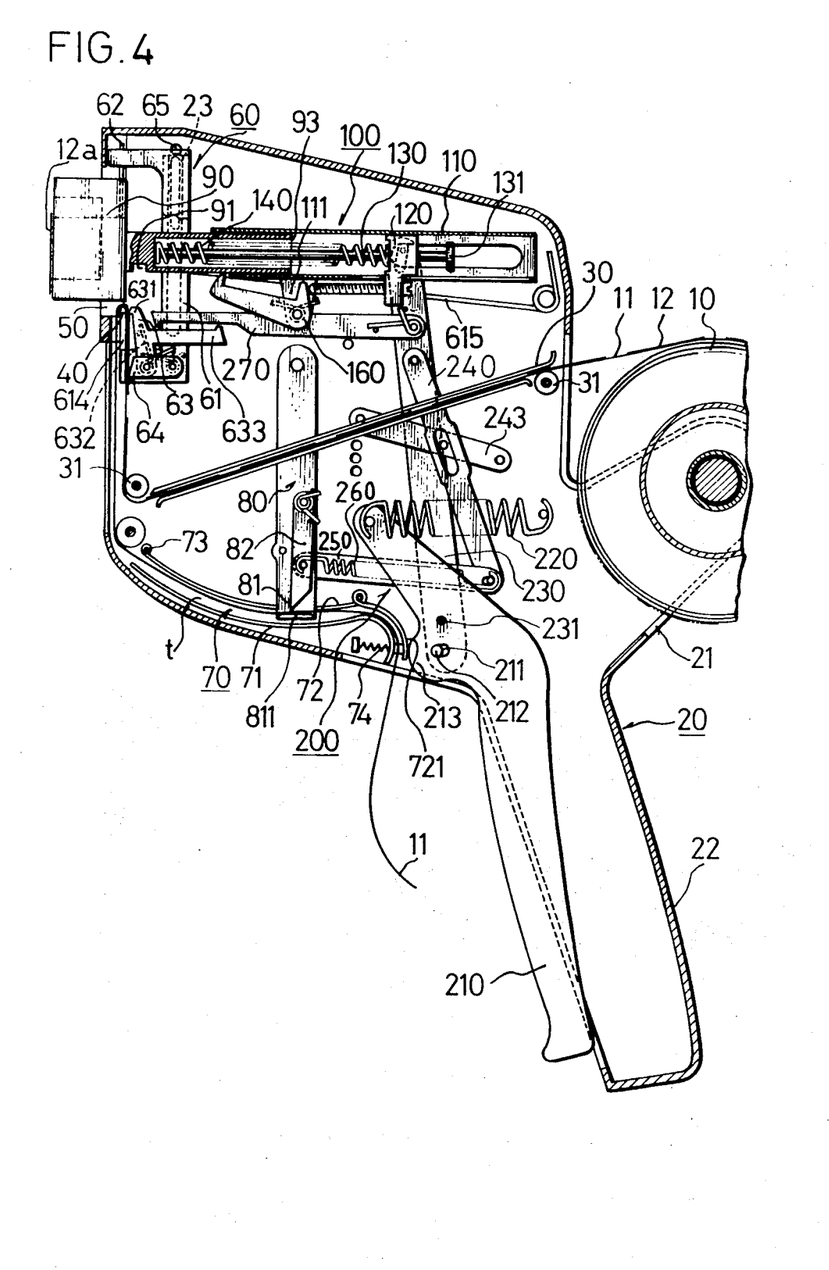
FIG. 4 is a cross sectional side view illustrating the condition of the labeler when a label is hammered out.

When lever 210 is pulled toward handle 22 of the case by gripping, the lever is shifted in oval hole 211 to release resilient member 72 of guide frame 70 as shown in FIG. 4 and the tape sheet outlet of guide frame 70 is opened by action of spring 74. As lever 210 is further pulled, rotary lever 230 coupled to lever 210 at pivot 231 rotates around pivot 212 as the fulcrum.

Because rotation of rotary lever 230 causes rotation of rotary coupling plate 240, spring 260 pulls rotary sub-plate 82 toward it. Rotary sub-plate 82 is depressed onto tape receiving surface 811 of tape receiving plate 81. Tape sheet 11 is held between rotary sub-plate 82 and tape receiving surface 811 because tape sheet 11 from which the labels are detached is supported by tape receiving surface 811.

Rotary sub-plate 82 is further rotated due to rotation of lever 210 and tape receiving plate 81 is rotated by rotary sub-plate 82, thus feeding tape sheet 11 is fed in guide frame 70.

Rotation of rotary lever 230 causes long latch arm 271 of releasing means 270 to advance toward moving part 60 and, at the same time, to advance slide 120 of hammering means 100.

Movement of slide 120 results in compression of spring 130 because hammering part 90 is held by hook member 160.

Figure 6A:
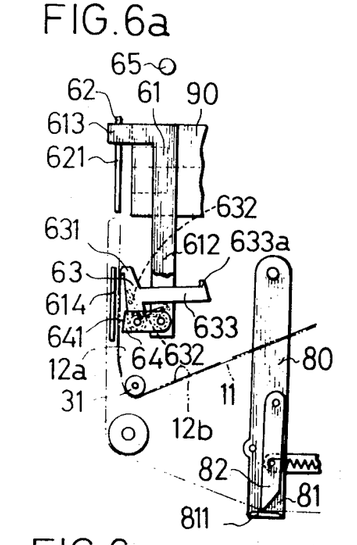
FIGS. 6a to 6c are side views of the moving member illustrating the operation of the moving member of the labeler.

As shown in FIG. 6a, moving part 60 lifts against the force of spring 615 because label sensing pawl 63 engages with label 12b following first label 12a.

Figure 6B:
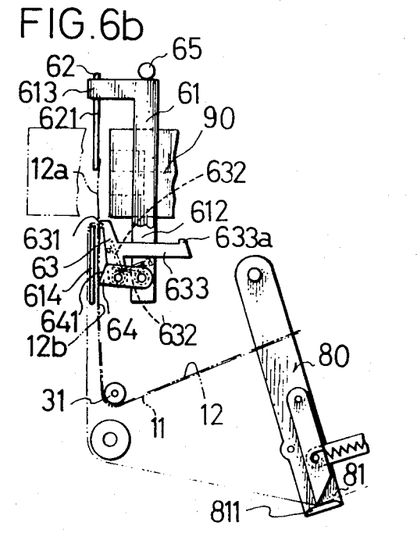

When label sensing pawl 63 engages with label 12b, tape holder 64 depresses tape 10 onto tape support plate 614 to hold the tape between tape support plate 614 and tape holder 64. Therefore, main frame 61 lifts while engaging with tape 10 along with feeding of tape sheet 11, that is, tape 10 by tape feeding means 80. Tape 10 is folded to return back at tape returning part 40 and label 12a is separated from tape sheet 11 and is projected into label hammer-out opening 50 as shown in FIG. 6b. Detached label 12a is held at its top end by label holder 62 extending inside from the moving part. When label 12a is detached from tape sheet 11, it is set in label hammer-out opening 50 in the manner such that its upper end is held by label holder 62 and its lower end is slightly adhered at the tape sheet. In this stage, main frame 61 is prevented from lifting by stopper 65.

As described in the foregoing, the feeding of the tape in the labeler according to the present invention is continued until main frame 61 is stopped by stopper 65. Under this condition, the tape feed distance is adjusted so that the lower end of label 12a is still adhered slightly to tape sheet 11.

If a tape carrying labels of a different size $l$ is employed, tape feed distance of tape feeding means 80 is adjusted by feed distance adjusting means 243.

If the rotation angle of rotary coupling plate 240 of actuating means 200 after main frame 61 has been stopped is small, rotation of rotary coupling plate 240 is absorbed by movement of pin 244 in oval hole 251 of connecting plate 250. In other words, tape 10 is stopped from moving through tape holder 64 when main frame 61 is stopped and therefore spring 260 is stretched to make rotary coupling plate 240 rotate.

Furthermore, label holder 62 begins to move together with main frame 61 the instant the feeding of tape 10 is started. Accordingly, the free end of label holder 62 is preferred to be opposed with a slight overlap outside tape returning part 40 to the extent that the free end can receive the projected end of a label being detached from the tape at the beginning of movement of the main frame.

To make the label holder receive the top end of a label as described above, the movement of the main frame can be started slightly later than the feeding of the tape. In this case, the free end of the label holder need not be opposed to the label returning part. In such cases, the tape can be fed as long as the lower end of a label is completely detached from the tape. In this case, a label holding part which holds the lower end of a label can be provided so that the label holding part is positioned near the tape returning part and within the label hammer-out opening. Thus, the label is held between the label holder and the label holding part which respectively hold the upper and lower ends of the label.

Since lever 210 finishes its rotation when the main frame stops, extension member 150 of hammering means 100 pushes end 163 of hook member 160 and hammering part 90 is released by hook member 160.

When hammering part 90 is released, spring 130 is also released and the force of spring 130 acts on hammering part 90 to cause hammer member 92 push out from label hammer-out opening 50. Accordingly, label 12a is hammered out by hammer member 92 and affixed onto an article.

When lever 210 is released, it is reset by spring 220. Upon resetting of the lever, the parts and members of the labeler operate as follows:

Cam part 213 of the lever depresses again resilient member 72 of guide frame 70 to close the outlet of the guide frame. Accordingly, tape 10 is prevented from reverse running. Rotary lever 230 is turned in the direction for resetting; therefore, connecting plate 250 is pushed by coupling plate 240 to reset tape receiving plate 81 to the home position and rotary sub-plate 82 is released from spring 260 and reset by reset spring 83 toward the direction where the sub-plate is separated from tape sheet 11.

Slide 120 of the hammering means is moved back and reset by rotary lever 230.

Because the slide is reset while engaging with stopper 131 of sliding shaft 130, hammering part 90 moves back, and hook member 160 of the hammering means engages with notch 91 when the notch comes at the position of the hook member to return to the home position.

Figure 6C:
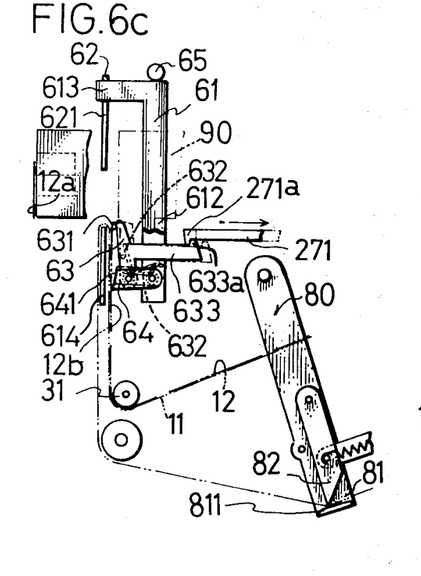

Long latch arm 271 of releasing means 270 engages latch arm 633 of label sensing pawl 63 of the moving part and moves back as shown in FIG. 6c; accordingly, label sensing pawl 63 is rotated and tape holder 64 is reset by spring 632' and is separated from tape 10.

Label sensing pawl 63 is released from long latch arm 271 shortly after it begins to turn and therefore tape holder 64 is maintained to be unable to engage with tape 10.

Because main frame 61 is lowered by reset spring 615, label sensing pawl 63 rubs the surface of tape 10 and engages the upper end of label 12b following the first label as shown in FIG. 7.

When label sensing pawl 63 engages with label 12b, main frame 61 is prevented from lowering.

Accordingly, main frame 61 is lowered by the distance from the upper end of first label 12a to that of second label 12b when label sensing pawl 63 detects label 12b and tape holder 64 is reset to be ready to depress the tape.

The operations described above are performed at the same time as the lever is reset and therefore the entire mechanism is reset to the original condition as shown in FIG. 3 when the lever is reset to the home position.

The labeler according to the present invention is as described above and provides the advantages described below.

This labeler hammers out the labels to affix them onto the articles; accordingly, the labeler can be operated to label even on small articles easier than the conventional labelers requiring the rub-to-affix action and the space for such action.

The labels in desired sizes can be selected in accordance with the dimensions of the label hammer-out opening because the label is held by the label holder provided with the moving member.

The labels can be steadily hammered out because the labels can be set in the label hammer-out opening by the movement of the moving member earlier than hammering timing by the hammering part.

As the label sensing pawl is provided at the moving part, the resetting distance of the moving part can be determined in accordance with the length of the first label and the moving part can be usually advanced up to the forward stop position and therefore the label can be positioned at a specified position in the hammer-out opening.

Because the sizes of labels are probably unequal due to improper processes of production, the labels cannot be accurately hammered out due to separation of the lower end of label from the tape sheet if the stroke of the moving member is fixed; however, as shown in the embodiment, if the moving member is arranged to lift as long as the length of the next label, each label can be positioned at a proper position.

The labeler according to the present invention can be constructed as described below.

Figure 5:
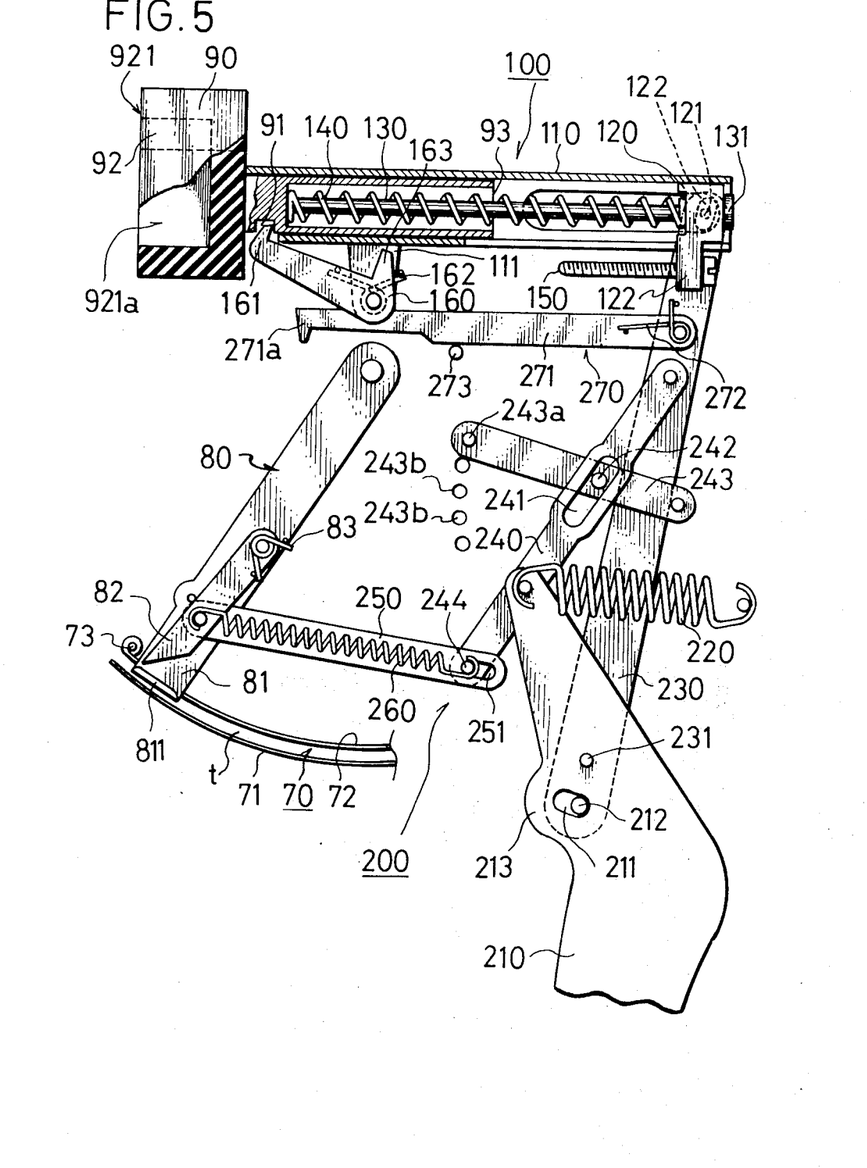
FIG. 5 is a magnified side view of the actuating means of the labeler.

It is desirable to provide thread on extension member 150 of hammering means 100 as shown in FIG. 5. Thus, the hammering timing of the hammering part can be adjusted.

Guide plate 71 and resilient member 72 of guide frame 70 are preferably arranged close to each other. To make it easy to understand the mechanism, the tape passage formed by the guide plate and the resilient member is s own as wide; however, if the tape passage is actually wide as shown, the tape sheet will have ripples or undulations and accordingly the tape sheet cannot be fed.

Because hammer member 92 of hammering part 90 passes through the space in main frame 61 of moving part 60 when it is hammered out, label holder 62 is required to be arranged not to interrupt movement of hammer member 92.

Figure 9A:
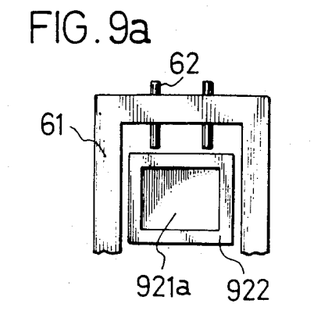
FIGS. 9a to 9f are front views of an embodiment of the hammer member to be employed in the labeler.
Figure 9B:
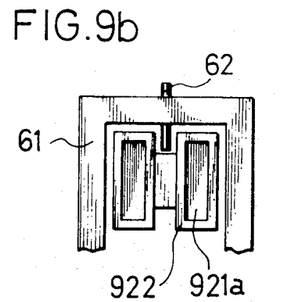
Figure 9C:
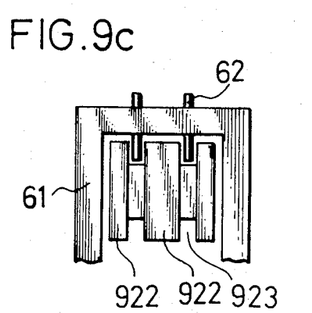
Figure 9D:
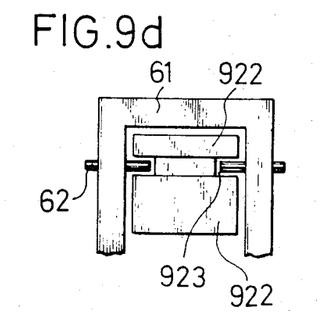

Therefore, generally the size of hammer member 92 is determined smaller as long as the length of the projected portion of label holder 62 than main frame 61 as shown in FIG. 9a. If the hammer member 92 is formed in such the size, the projecting length of label holder 62 is limited by the hammer member; accordingly, it is desirable to form hammer member 92 with a plural number of elastic blocks 922 as shown in FIGS. 9b to 9d and to form groove 923, in which label holder 62 can be placed when the hammer member is driven out for hammering out the label, in the hammer member.

Figure 9E:
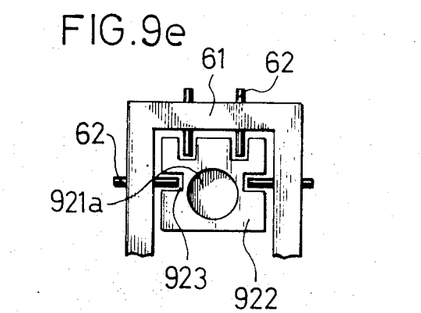

For the same reason, hammer member 92 can be formed with one elastic block 922 which is provided with at least one groove 923 by partly cutting as shown in FIG. 9e.

Figure 9F:
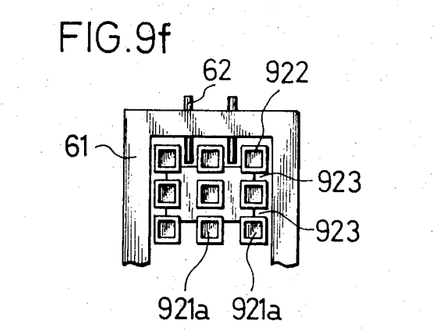

Furthermore, hammer member 92 can be made with a plural number of blocks 922 to form many grooves 923 as shown in FIG. 9f. In this case, label holder 62 can be projected in any direction. In any case, it is desirable to provide hold 921a which is open at the hammering surface of a block which forms the hammer member. Thus, the label adhering effect is improved and a label can be easily affixed on an egg or the like.

Figure 10A:
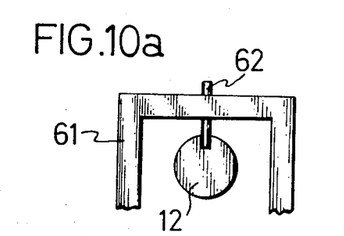
FIGS. 10a to 10e are front views of labels to be affixed by the labeler.
Figure 10B:
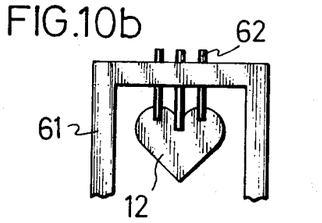
Figure 10C:
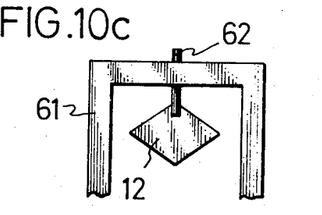
Figure 10D:
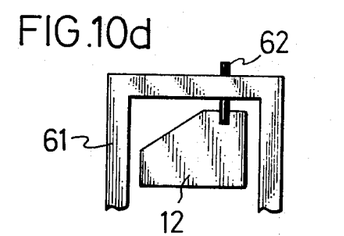

The length and number of projected portions of the label holder are determined with the shape of label. If the label is, for example, round, label 12 can be held at one point of the projecting end as shown in FIG. 10a and, if the label is of a heart shape, label 12 is held at two or three points as shown in FIG. 10b. If the label is a lozenge, label 12 can be held at one center top point as shown in FIG. 10c and, if a trapezoid, label 12 is held at its biased top end point as shown in FIG. 10d.

Figure 10E:
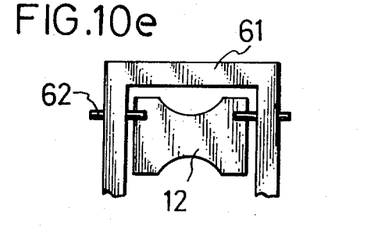
Figure 11:
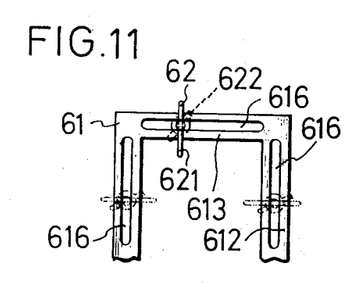
FIG. 11 is a front view of an embodiment of the label holder of said moving part.

If the label is of a shape which expands at its both sides, label 12 is preferred to be held at its both sides as shown in FIG. 10e.

Label holder 62 is thus often modified by changing the projecting position and the projecting length into the main frame; accordingly, it is desirable to provide a long through hole 616 in main frame 61 and to fit label holder 62 into the long hole so as to be shiftable in the hole and to fix it at a desired position.

As the fixing means, wing nut 622 as shown can be used and the other fixing means can also be employed.

Long hole 616 is preferred to be provided respectively at brackets 613 and side plates 612. Thus, label holder 62 can be provided at any part of the main frame as shown with a broken line.

The label holder can be fitted remountably in the moving member. Thus, the label holder of a different length can be employed.

Said tape feeding means can be constructed with a pair of rotary drums which feed the tape sheet therebetween.

Said tape retaining means need not have the shaft to retain the tape; for example, the tape can be held in a case in which a tape roll can be freely rotated.

What is claimed is:
1. A labeler comprising:
  (a) a case having a retaining means which retains a tape consisting of a tape sheet and a plural number of labels adhered on said tape sheet at predetermined small intervals, and a tape passage which guides the tape;
  (b) a label hammer-out opening provided on said case;
  (c) a tape returning part contacting the rear surface of the tape sheet so that said tape returning part folds the tape sheet to reverse its direction and to detach a label from the tape sheet to project a portion of said label into the hammer-out opening;
  (d) a tape feeding means which pulls the tape folded at the tape returning part and feeds a predetermined length of tape every feeding operation;
  (e) a moving part which moves along the label hammer-out opening engages said label and pulls said label into said hammer-out opening in accordance with feeding of said tape;
  (f) at least one label holder which is provided in said moving part wherein said label holder holds at least one point of the projected end of a label projected in said label hammer-out opening;
  (g) a hammering means which is housed in the case so that said hammering means is positioned inside the label hammer-out opening, said hammering means provided with a hammer member made of an elastic material which is quickly driven out by the hammering means from the label hammer-out opening and hits the label after said moving part pulls said label into said hammer-out opening.
  (h) A resetting means which resets the hammering means after said hammer member has been driven out;
  (i) a resetting means which resets the moving part after said hammering means has been reset, and;
  (j) a resetting means which resets the tape feeding means to be ready to resume feeding of the tape after said moving part has been reset.

2. A labeler according to claim 1, wherein the moving part is provided with a label sensing pawl which engages with the advancing end of a label following a first label positioned at the tape returning part to control the resetting distance of said moving part when it is reset.

3. A labeler according to claim 2, wherein the moving part is provided with a tape holder at one side of the tape which operates together with the label sensing pawl and a tape support plate which is opposed to the tape holder on the other side of the tape, and wherein said tape holder is arranged so that the tape is depressed onto the tape support plate when the label sensing pawl engages with the advancing end of a second label following the first label upon resetting of the moving part.

4. A labeler according to claim 1, wherein the moving part comprises a main frame having at least one side plate wherein said main frame is moved along the inside wall of the case in which the hammer-out opening is formed and a bracket provided on one end of said side plate for mounting said label holder.

5. A labeler according to claim 4, wherein the label holder is provided on the bracket so that the label holder projects into a space formed inside the main frame.

6. A labeler according to claim 5, wherein a long hole is provided in the bracket for mounting the label holder thereby the label holder can be shifted to a desired position in said long hole.

7. A labeler according to claim 1, wherein the projected is designed so that the length of said label holder into the hammer-out opening can be freely adjusted.

8. A labeler according to claim 1, wherein the label holder is remountable in the moving part.

9. A labeler according to claim 1, wherein the hammer member of the hammering means is provided with at least one hole which is open at the hammering surface.

10. A labeler according to claim 1, wherein the hammer member of the hammering means is formed with at least two elastic blocks which are arranged in a plane parallel to the hammer-out opening.

11. A labeler according to claim 10, wherein a groove into which the label holder can freely pass when the hammer member of the hammering means is driven out is provided between a plural number of said elastic blocks.

12. A labeler according to claim 1, wherein one elastic piece is provided on said hammer member with at least one groove at the periphery thereof, whereby the label holder can freely pass into said groove when the hammer member of the hammering means is driven out.

13. A labeler according to claim 1, including a hammer member driving means comprised of (a) a spring which is compressed by an actuating means while the tape is being fed and, (b) a releasing means which releases the compressed spring to drive out the hammer member by the reaction of the spring after the moving part has pulled said label into the hammer-out opening.

14. A labeler according to claim 1, including a guide frame comprising (a) a guide plate and (b) a resilient member, opposed in parallel to the guide plate, at at least one position in the tape passage wherein said resilient member is separated from the guide plate while the tape is being fed and is depressed onto the tape support plate with the tape sheet therebetween while the tape is stopped.

15. A labeler according to claim 14, wherein one end of the guide frame is formed as the tape outlet at which the resilient member is depressed onto and separated from the guide plate.

16. A labeler according to claim 1, wherein the tape feeding means feeds the tape a distance such that the rear end of the label projected into the hammer-out opening is not separated from the tape sheet.

References Cited

UNITED STATES PATENTS

| | | | |
|---|---|---|---|
| 3,736,212 | 5/1973 | Fedrick | 156—442 X |
| 3,586,587 | 6/1971 | Boyce | 156—577 X |
| 3,440,123 | 4/1969 | Hamisch | 156—556 X |
| 3,146,149 | 8/1964 | Silverstein | 156—577 X |
| 1,834,170 | 12/1931 | Mohr | 156—577 X |

DOUGLAS J. DRUMMOND, Primary Examiner

M. G. WITYSHYN, Assistant Examiner

U.S. Cl. X.R.

156—556, 577, 579, 584, DIG 33